Jan. 1, 1946.　　　　K. W. COUSE　　　　2,391,948
MEANS FOR SHIFTING THE RELATIVE POSITION
OF THE BODIES AND WHEELS OF VEHICLES
Filed Jan. 27, 1944　　　11 Sheets-Sheet 1

Inventor:
Kilbey W. Couse
By A. D. T. Libby
Attorney.

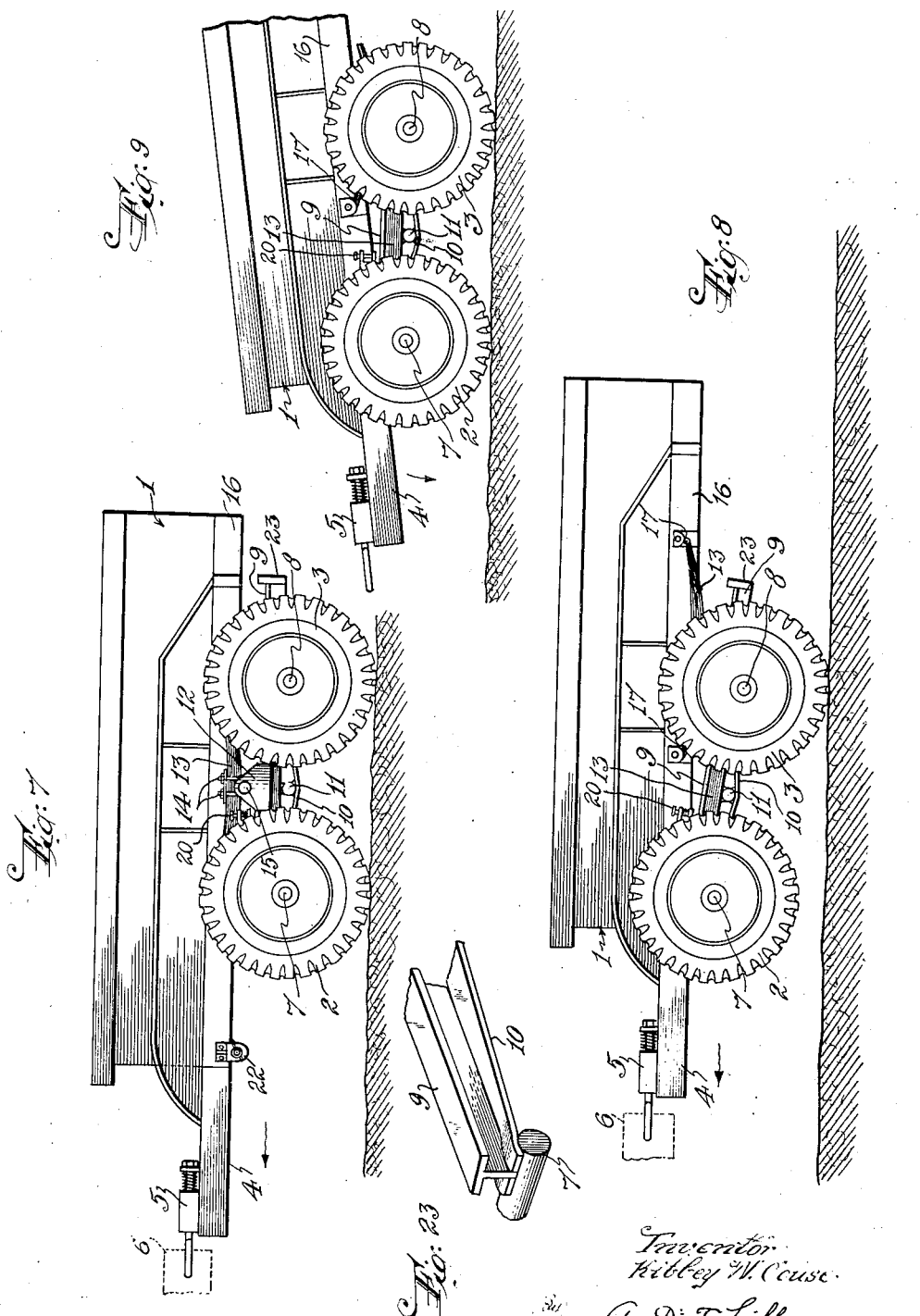

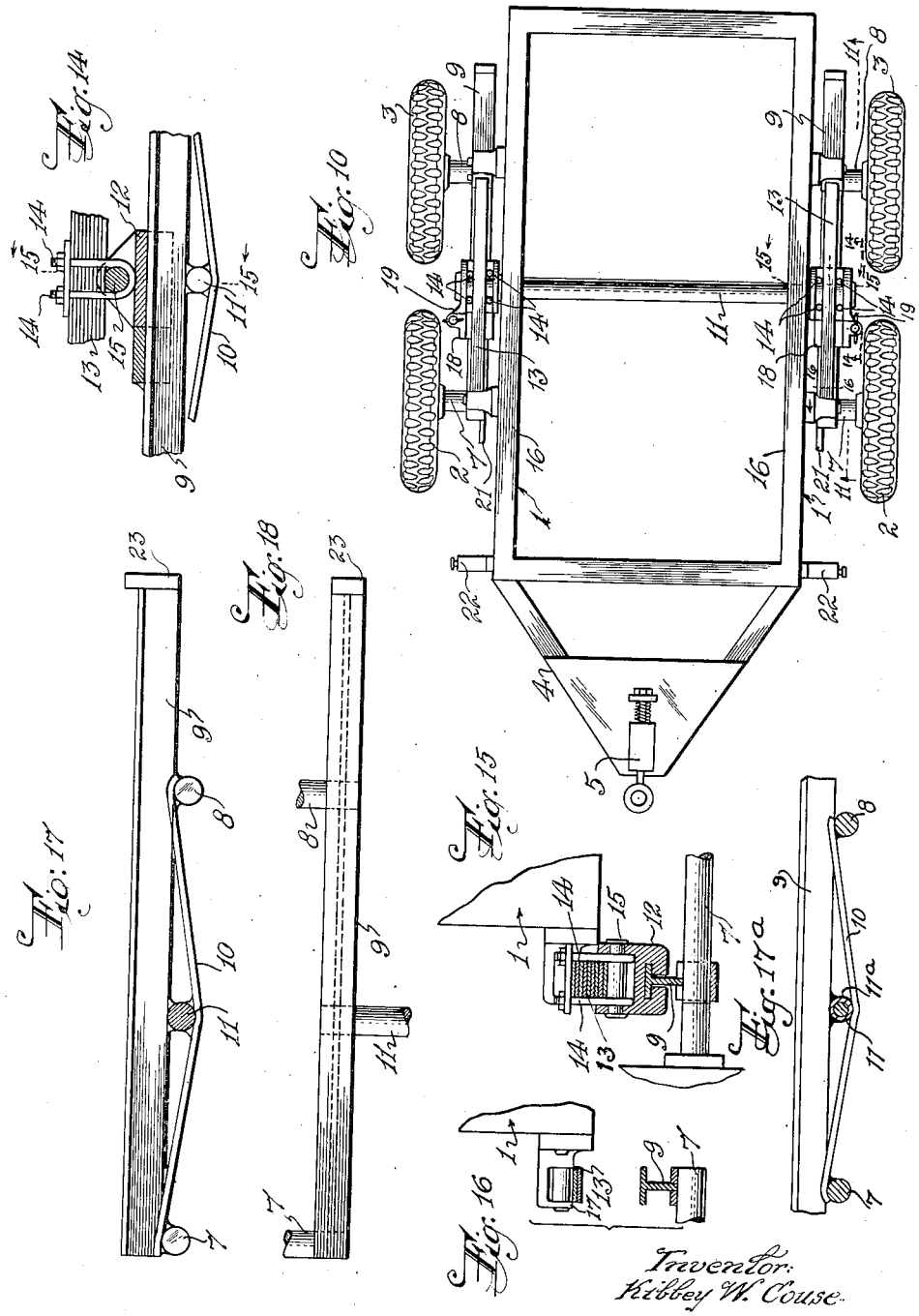

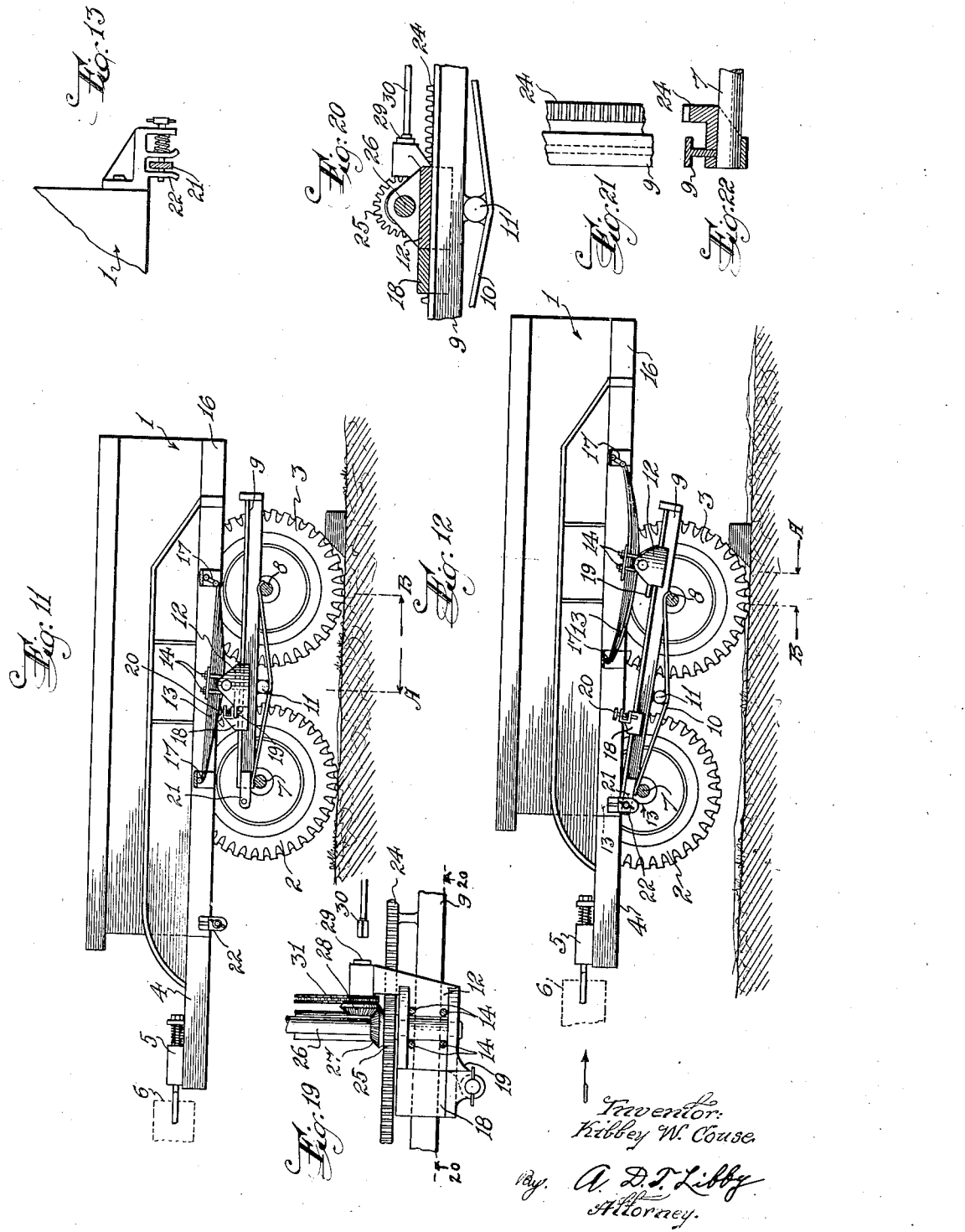

Jan. 1, 1946. K. W. COUSE 2,391,948
MEANS FOR SHIFTING THE RELATIVE POSITION
OF THE BODIES AND WHEELS OF VEHICLES
Filed Jan. 27, 1944 11 Sheets-Sheet 5
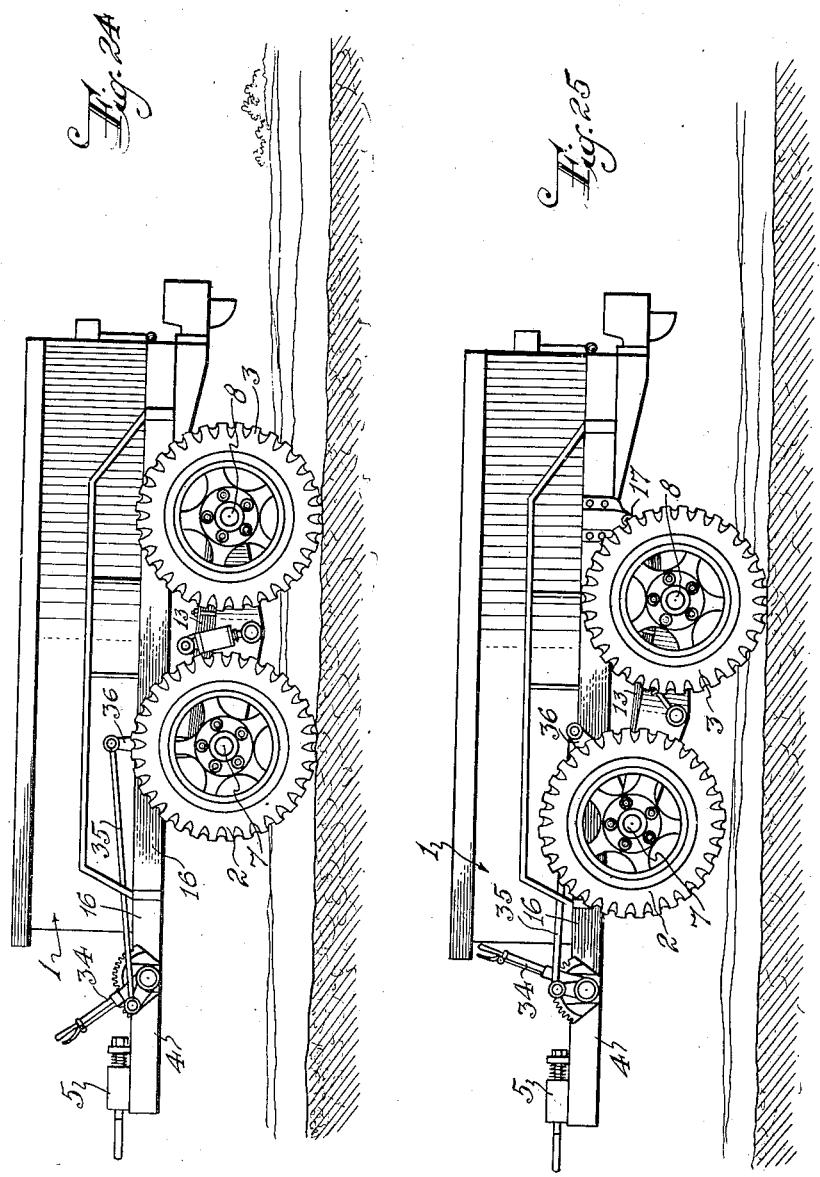
Inventor.
Kibbey W. Couse
By: A. D. T. Libby
Attorney.

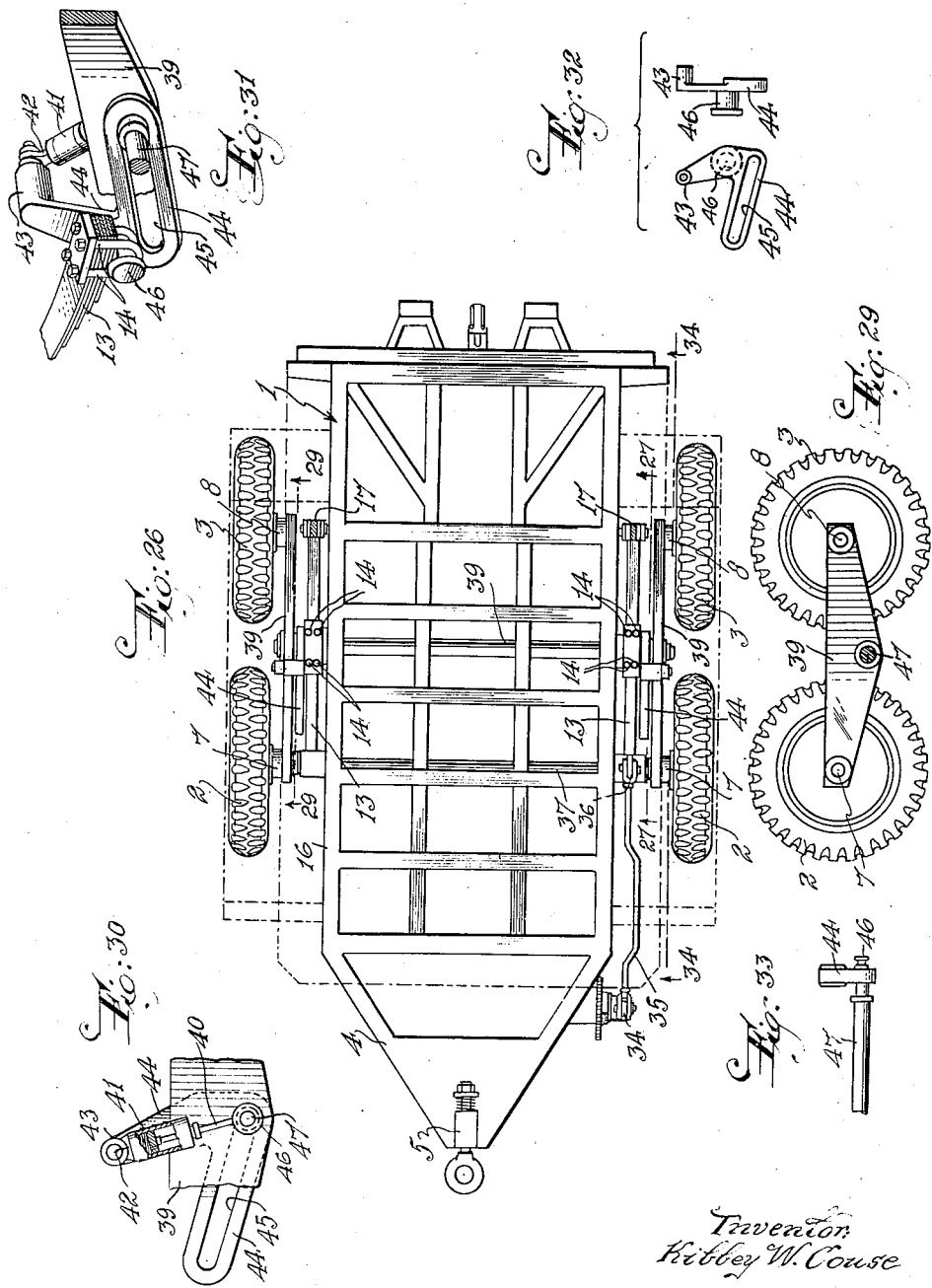

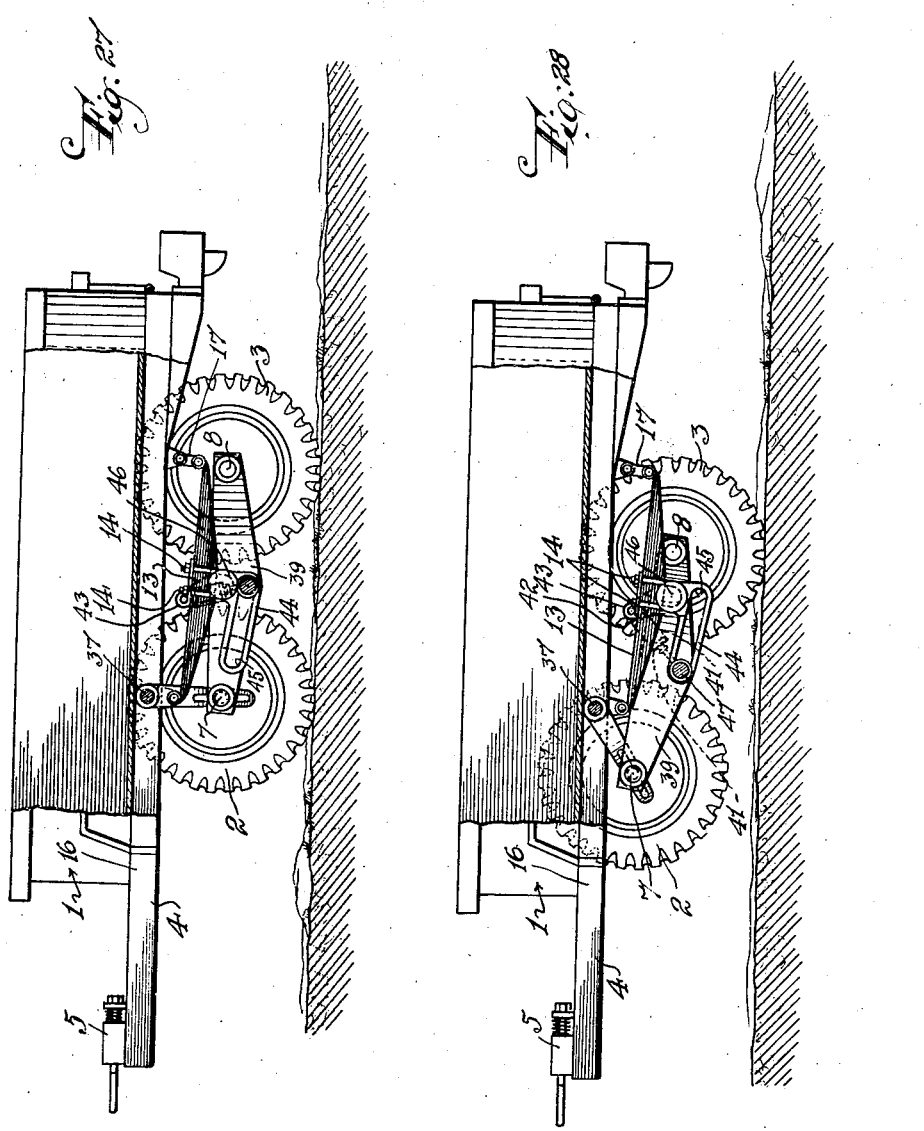

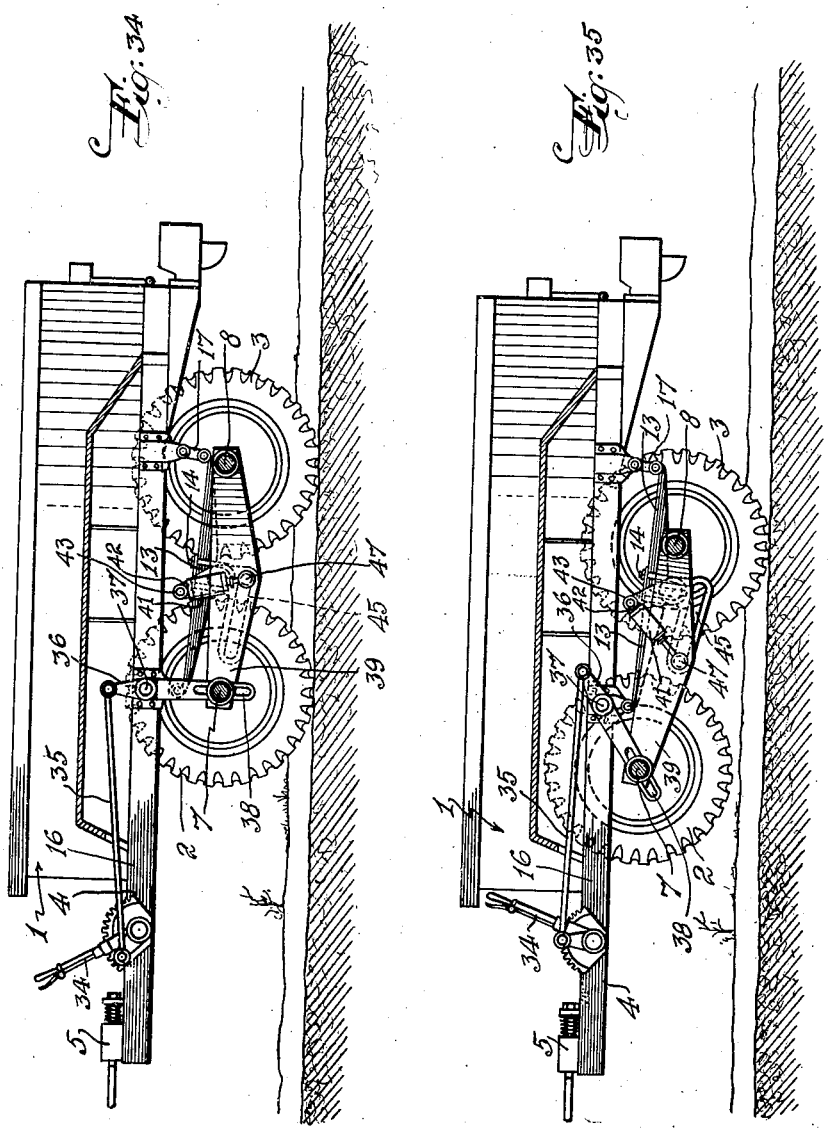

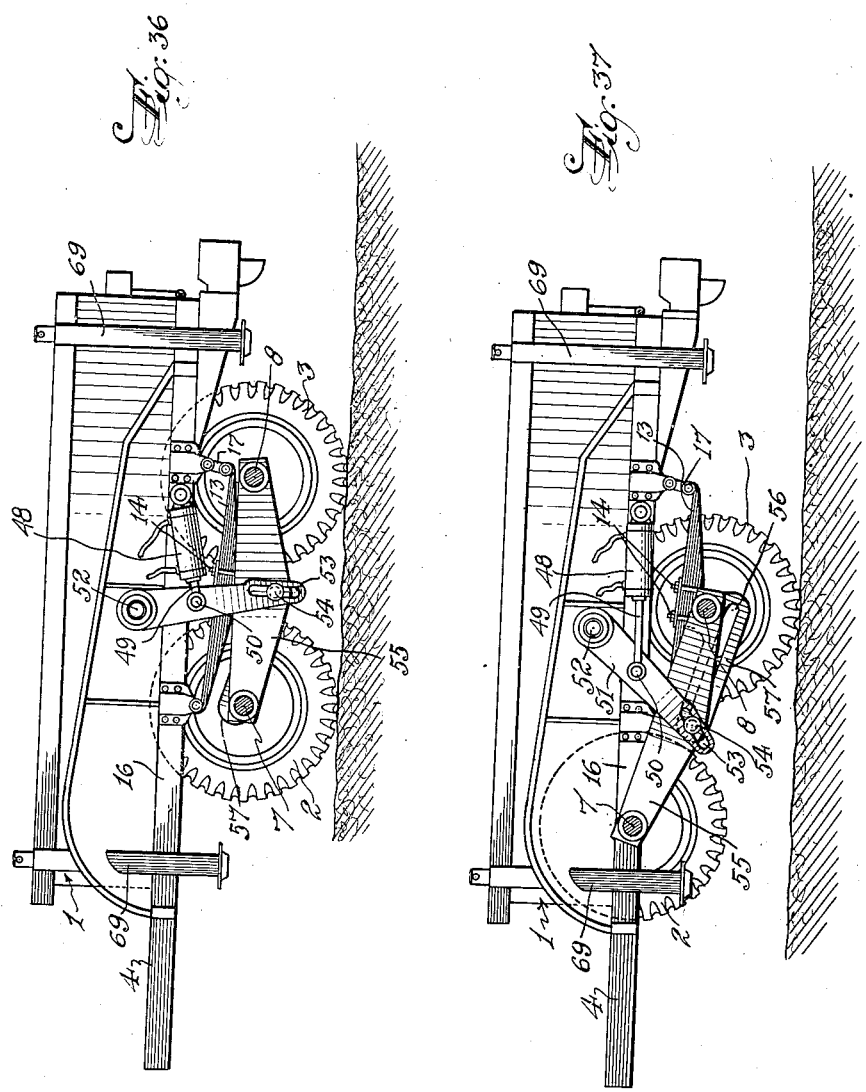

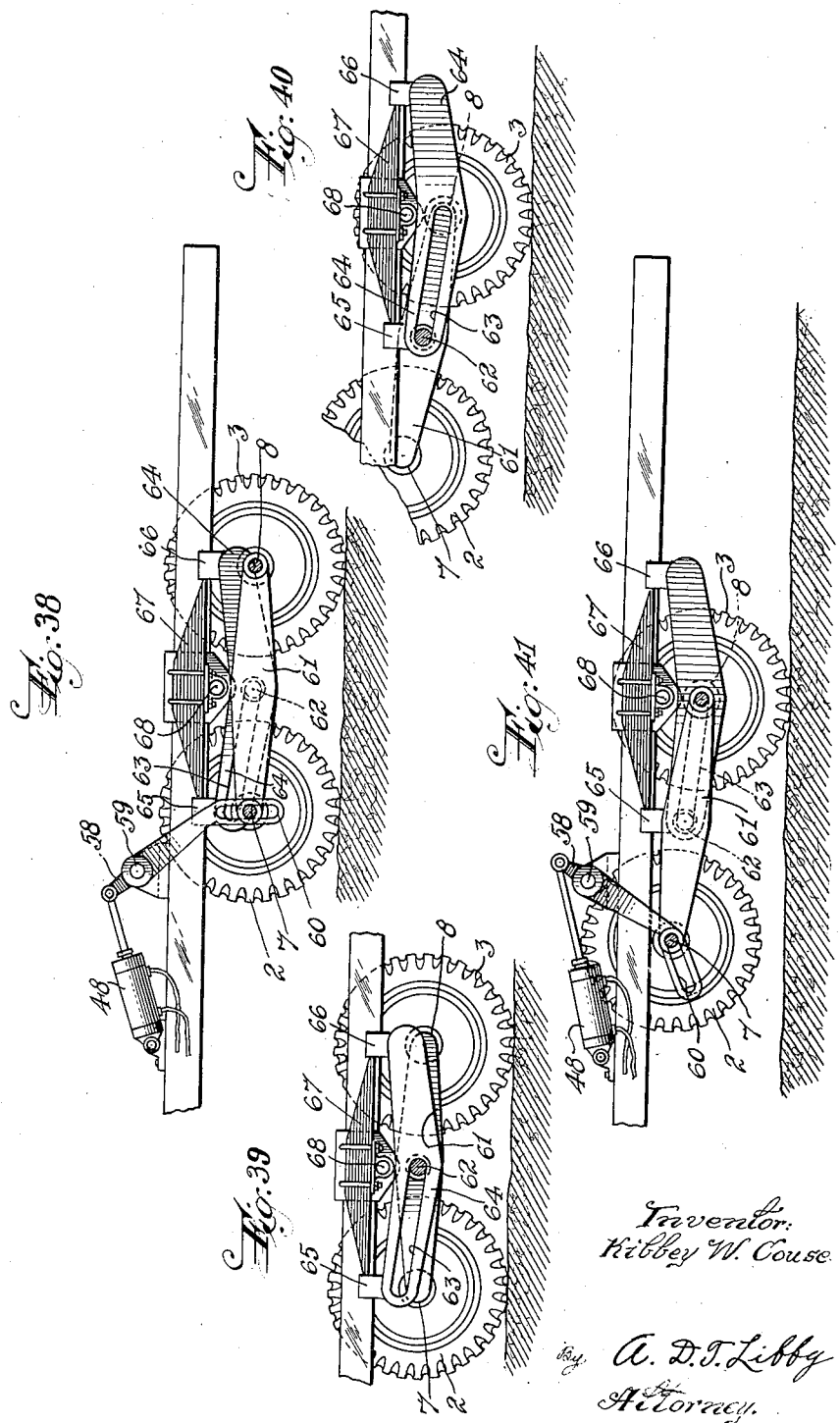

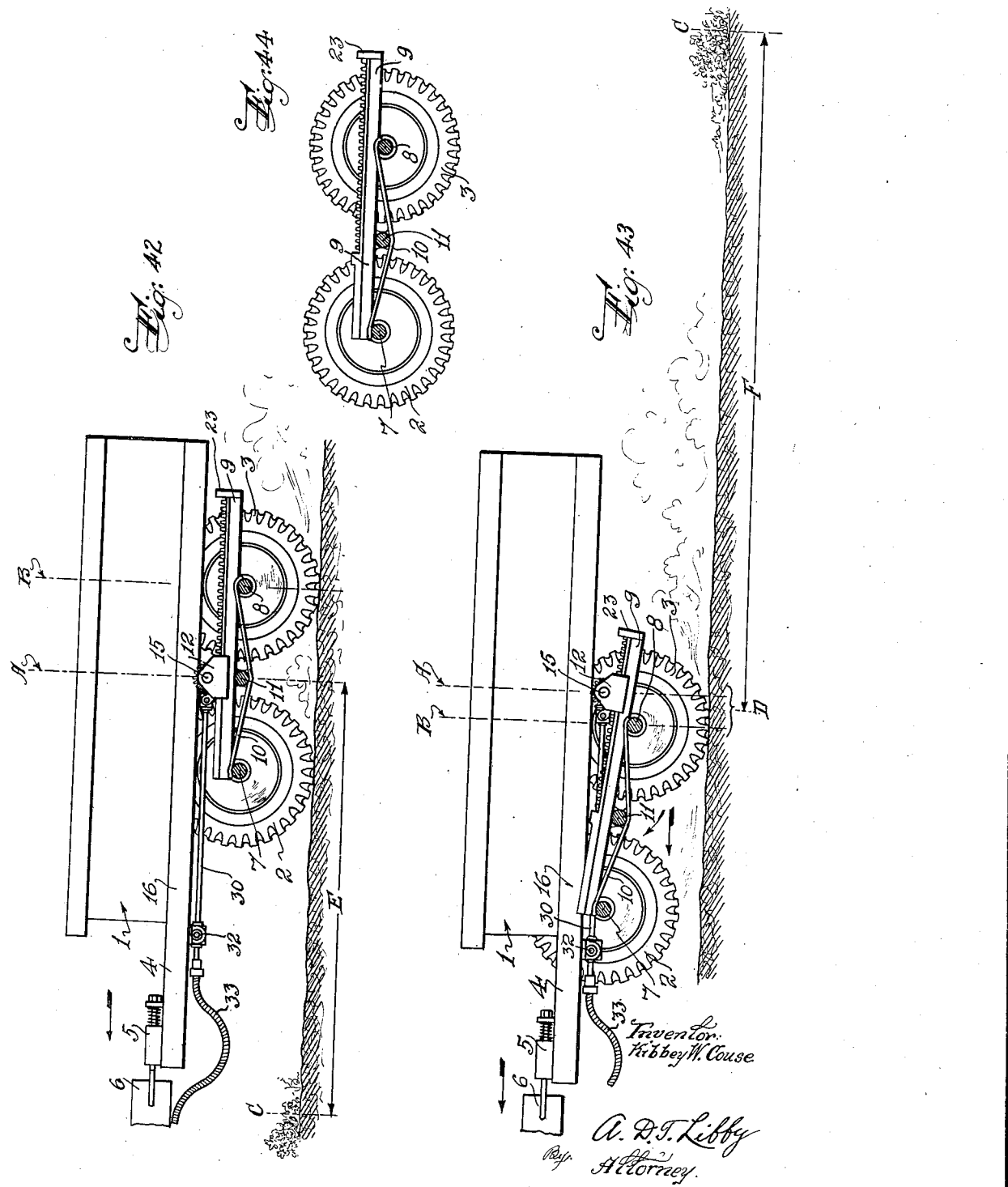

Patented Jan. 1, 1946

2,391,948

UNITED STATES PATENT OFFICE 2,391,948

MEANS FOR SHIFTING THE RELATIVE POSITION OF THE BODY AND WHEELS OF A VEHICLE

Kibbey W. Couse, Newark, N. J.

Application January 27, 1944, Serial No. 519,846

18 Claims. (Cl. 280—104.5)

This invention relates to improvements in automotive construction.

In at least certain types of vehicles, such as trailers, and especially those used in the armed service for transporting search lights, Radar and other type of equipment which have to be transported at considerable speed under adverse conditions and over difficult terrain, a four-wheel construction is used, but in such a manner that there is little or no steerability. Hence, the forward wheels of such a trailer, in making a turn, are dragged laterally and if such a trailer is running in mud or ruts at that time, it is practically impossible to make a turn.

It is therefore one of the objects of my invention to provide a construction in which the front wheels of the trailer may be raised out of the mud or rut so that a turn may be made with a high degree of safety.

Furthermore, it happens many times that when the trailer is running on smooth ground, and especially if lightly loaded, it is advantageous to raise the forward wheels to save wear and tear on the tires. This last advantageous feature applies to vehicles of other types of trailers.

It is therefore a further object of my invention to apply the general idea to various types of vehicles.

Other objects will appear from a study of the specification and drawings, from which it will be seen that the general objects are attained in a very expeditious manner by shifting the center of gravity of the body carrying the load with respect to the center lines of the wheel axles and at the same time having the load center approximately half-way between the front and rear axles when all four wheels are on the ground, or over the single rear axle when the front wheels are off the ground or when the vehicle is running as a two-wheel arrangement.

In the constructions to be described, the shifting of the center of gravity of the entire structure occurs simultaneously with the raising and lowering of the forward wheels. This is done either by horizontally shifting the body of the vehicle while the rear wheels remain substantially stationary, or by shifting the rear wheels horizontally while the body remains fixed, the latter result being attained by causing the rear wheels and axles to have a higher speed in a forward direction than the body of the vehicle, as will be explained later.

In order to present the general problem in sequence of operation, I have illustrated, diagrammatically, in Figures 1 to 6 inclusive, a trailer having four wheels, although the rear wheels may have a dual arrangement.

Figure 1:
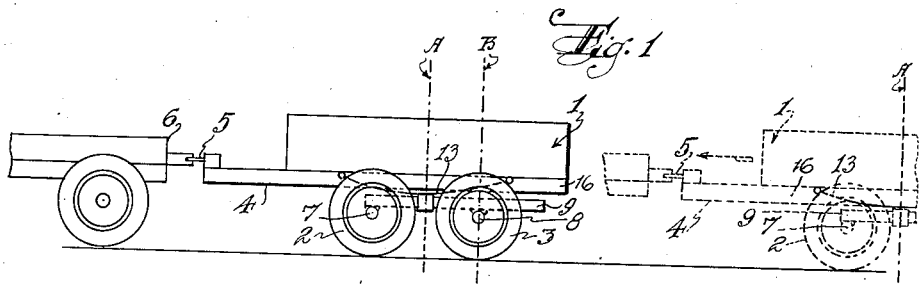
Figure 1 illustrates a trailer being drawn by some kind of automotive vehicle from right to left, as is illustrated in the central view, at which time it is desired to shift from four wheels onto two wheels, line A representing the center line of the load, and line B representing the center line of the rear axle.
Figure 2:
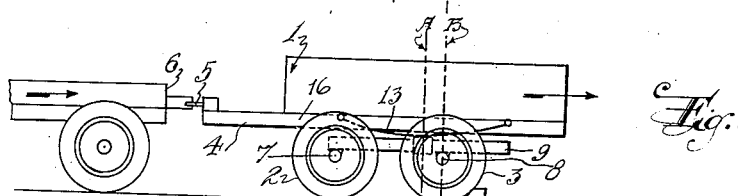
Figure 2 shows the trailer with the rear wheels trigged so that they cannot move backwardly, and the automotive drawing power reversed, under which condition the body of the trailer has been shifted so that the line A is near the line B, but there has as yet been no lifting of the front axle.
Figure 3:
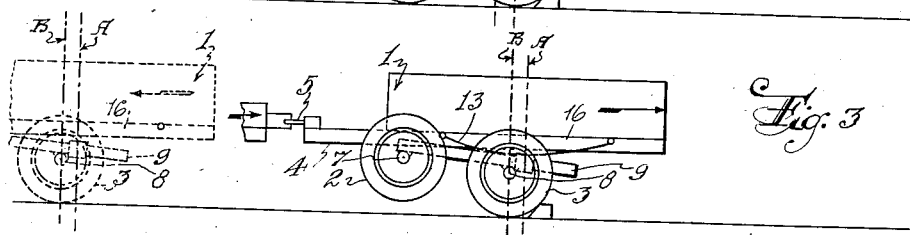
Figure 3 shows a further step in the shifting process whereby the line A has moved a short distance to the rear of the line B, and the center of weight is applied to the parts carrying the rear wheels; this causes the front wheels to be lifted free from the ground. Under this condition, the trailer may be moved forwardly as indicated at the left of Figure 3.

In Figures 1 to 3 inclusive, the change in the relative position of the body and wheels is obtained by the shifting of the body structure; for example, to get Figure 3 back to Figure 1, the trig is moved in front of the rear wheels and the body pulled forward.

Figure 4:
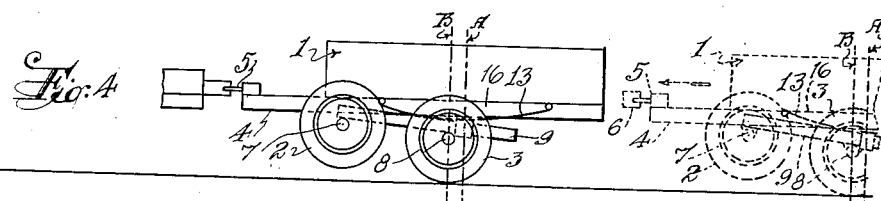

Figure 4 shows a structure in which the shifting is to be done by other means to be described. The structure is shown approaching from the right, with the front wheels raised. When it reaches the central position, it is desired to drop the front wheels.

Figure 5:
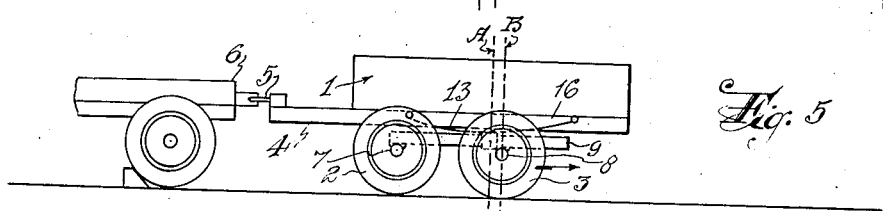

This is done, as shown in Figure 5, by the application of the brakes to the drawing vehicle, this application being diagrammatically illustrated by a trig whereby the body of the trailer is stopped in its forward motion.

Figure 6:
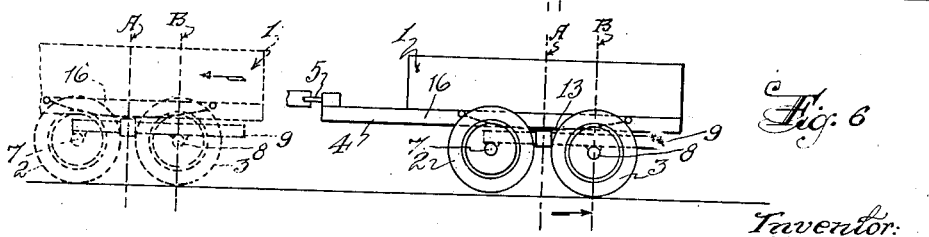

Then, by applying force, to be later explained, to the structure carrying the wheel axles, the wheels are caused to move to the right in the direction of the arrow. When the line B reaches the position shown in Figure 5, the front wheels may drop to the ground, and further continued application of said force brings the line B back to normal four-wheel position, and the line A is then midway between the front and rear wheel axles as shown in Figure 6. To shift from the four-wheel position of Figure 6 to two wheels, the operations are reversed.

Figure 7 is a side view of the preferred form of the invention as applied to a trailer, all four wheels being in contact with the ground, with the central line of the weight being in the position shown in Figure 1.

Figure 8 is a view of Figure 7, but with the relative position of the body and wheels shifted to the position shown in Figure 3.

Figure 9 shows the position of the body of the trailer when disconnected from the hauling vehicle.

Figure 10 is a top plan view of Figure 7 with the top part of the body removed.

Figure 11 is a section on the line 11—11 of Figure 10, the parts being shown in the position of Figure 7, with the rear wheels trigged for shifting.

Figure 12 is a view similar to Figure 11, but with the parts shown in the position of Figure 8.

Figure 13 is a fragmentary view of the forward locking means on the line 13—13 of Figure 12, with the slide rail in locked position.

Figure 14 is a section on the line 14—14 of Figure 10.

Figure 15 is a section on the lines 15—15 of Figures 10 and 14.

Figure 16 is a section on the line 16—16 of Figure 10.

Figure 17 is a side view of one of the slide members or rails on which the body supports move.

Figure 17a is a view similar to Figure 17, showing a slightly modified form of construction.

Figure 18 is a plan view from the top of Figure 17.

Figure 19 shows one form of obtaining a shift between the body and the wheel structure.

Figure 20 is a view on the line 20—20 of Figure 19 with some parts omitted.

Figure 21 is a fragmentary plan view of a portion of the slide and rack shown in Figure 20.

Figure 22 is an elevational view of Figure 21.

Figure 23 is a fragmentary perspective view of one end of the slide or rail structure carrying the wheel spindles or axles.

Figure 24 is a view similar to Figure 7, but showing a modified form of construction.

Figure 25 is a view of Figure 24 with the front wheels in raised position.

Figure 26 is a plan view of the structure of Figure 24 with the top of the body removed.

Figure 27 is a side view of the structure of Figures 24 and 26 on the line 27—27 of Figure 26.

Figure 28 is a view similar to Figure 27, but with the front wheels in raised position.

Figure 29 is a view on the line 29—29 of Figure 26.

Figures 30, 31, 32 and 33 show views of certain parts of the construction illustrated in Figures 26, 34 and 35.

Figure 34 is a view on the line 34—34 of Figure 26.

Figure 35 is a view of Figure 34 but with the front wheels of the vehicle in raised position.

Figure 36 is a view similar to Figure 34 but of a still further modified form of construction.

Figure 37 is a view of Figure 36 with the front wheels of the vehicle in raised position.

Figure 38 shows the application of my invention to an automotive vehicle of a different type than a trailer.

Figure 39 is a view like Figure 38, but taken between two of the parts shown therein.

Figure 40 is a view of Figure 39 with the front wheels in raised position.

Figure 41 is a view similar to Figure 38, but with the parts in raised position.

Figure 42 is a view showing a further modified form of construction.

Figure 43 is a view of Figure 42 but with the front wheels in raised position.

Figure 44 is a side view of the wheel structure shown in Figure 42.

In the various views wherein like numbers refer to corresponding parts, 1 is the body of a vehicle and, as shown in Figure 1, is of the four-wheel trailer type having front wheels 2 and rear wheels 3. As heretofore stated, the rear wheels 3 may be of the dual type if so desired.

The body 1 has an extended portion 4 carrying an attachment 5 for connecting it to some type of automotive hauling vehicle 6. The wheels 2 and 3 on each side of the trailer are carried on their respective spindles or stub shafts 7 and 8 which form the axles of the wheels. I prefer to mount the wheels on stub shafts rather than on axles which pass transversely across the trailer for the reason that the wheels will follow the contour of the terrain very much better and get better traction with less strain on the wheels and on the entire structure.

The spindles or stub shafts 7 and 8 are fastened as by welding to the under side of guide members 9, one on each side of the structure, which are preferably in the form of a T (see Figures 15 to 18 inclusive). Each T is preferably reenforced by a stiff flat plate 10 which is curved and slotted at the ends as shown in Figure 23, and these ends are welded to the wheel shafts 7 and 8 so as to form an integral structure. At the central point between the shafts 7 and 8, a reenforcing member or bar 11 connects the two T-beams 9, the fastening being made in any satisfactory manner as by welding. If desired, instead of the support member 11 itself being welded directly to the plates 10 and T-irons 9, its ends may be housed in two collars 11a, one on each side of the chassis as shown in Figure 17a, and which are welded to the parts 9 and 10, thereby allowing a certain oscillatory motion of the T-members 9 independently one of the other.

Each guide member 9 has a fitting 12 slidably mounted thereon. The fittings are positioned on the T-irons as shown in Figure 15. To the fittings 12 are fastened the central portions of the springs 13 in the usual manner by U-shaped fasteners 14 that are, in turn, anchored to the fittings 12 by bolts or studs 15. The ends of the springs 13 are fastened to the body member 16 by the usual type of link fastening 17. The rail member 9 carries an outwardly positioned stop 18 which may be welded directly thereto or adjustably positioned on the T-iron 9.

Each of the fittings 12 has an arm or finger 19 projecting therefrom to engage the stop 18 and can be fastened thereto in any satisfactory manner as by a pin 20, thereby anchoring the fitting 12 in position as shown in Figures 7 and 11, whereby the center of gravity of the load is positioned substantially between the wheel axles 7 and 8, as well as in vertical alignment with the reenforcing member 11. Each of the slides or T-members 9 is provided with projections 21 which are adapted to engage a stop fastener 22 fastened securely to the member of the body 1, whereby when the parts are in the position shown, for example in Figure 12, the forward ends of the members 9 are anchored directly to the body, thereby holding the front wheels 2 in elevated position.

The above description substantially completes the structure diagrammatically illustrated in Figures 1 to 3, and from what has been said, it is believed that the operation of the structure will be clear. However, it may be said that when the trailer is being drawn by the vehicle 6, with the four wheels on the ground as illustrated in Figure 1, and it is desired to raise the front wheels 2, this is accomplished by stopping the vehicles, trigging the rear wheels as shown in Figure 2, and reversing the driving vehicle, but first withdrawing the locking pin 20 so as to allow the fittings 12 to slide on the guide members 9.

When this is done, the body 1 moves to the position shown very clearly in Figure 12, and as soon as the center of gravity, illustrated by the line A, moves from the position of Figure 1 to that of Figure 3, the parts are in the position shown in Figure 12. It should be noted that the rear end of the guide rail 9 is provided with a stop member 23 to prevent the fittings 12 from ever passing off the rear end of the guide rails should the operator forget to make the connection between the projection 19 and the lock member 18. In this position, the projection 21 of the T guide bar is fastened to the fastener 22, thereby anchoring the front wheels 2 in their elevated position so that the trailer can be better navigated through mud or out of ruts or what-not. Furthermore, the trailer may be operated with the front wheels raised if there is no load in the trailer or, if loaded, the trailer is operating on a smooth road, thereby saving wear and tear on the front wheels.

It may happen that the pulling vehicle and trailer are stuck in the mud or terrain, or the pulling vehicle is disabled by some force thereby rendering it inoperative, and it is necessary to get the trailer, carrying signaling equipment or some other important apparatus, out of the mud or terrain to some designated point. When this occurs, then the puller is disconnected from the fastener 5 and, provided the trailer is equipped with a structure such as shown in Figures 19 to 22 inclusive, the body may be shifted so that the front wheels will be raised out of the mud and a new force, either of men or machines, applied to the projecting end 4 of the trailer to swivel it out of the rut.

The apparatus shown in Figures 19 to 22 comprises a gear rack 24 which is fastened to each slide member 9. Meshing with each of the gear racks 24 on opposite sides of the trailer, are gears 25 carried by a transverse shaft 26. This shaft carries a bevel gear 27 which is in mesh with a bevel gear 28, and the bevel gear 28 has a stub shaft 29 with a socket adapted to receive an operating rod 30. The shaft 29 carries an endless chain 31 which is in mesh with a similar stub shaft 29 on the opposite side of the trailer, whereby the power applied by the rod 30 is applied to the racks 24 and guide members 9 on opposite sides of the trailer. The turning of the gears 28, 27 and 25 causes the whole gear structure to move along the rack 24 and the guide members 9, and since the fittings 12 are fastened to the body in the manner heretofore described, the body is carried rearwardly or forwardly as desired so that the front wheels 2 will be raised or lowered accordingly.

Even though the trailer is not in the mud, it may be desirable to operate it on the rear wheels only, as heretofore pointed out, in which case it is not unfastened from the pulling vehicle, but the guide members 9 are unfastened from the members 22 and a trig is put in front of the pulling vehicle as illustrated diagrammatically in Figure 5, so that on the operation of the rod 30, the rack will be forced to move and the results will be identical as heretofore described for either raising or lowering the front wheels.

In Figures 42, 43 and 44 the arrangement is very nearly the same as that shown in Figure 19, except that in these latter figures the rod 30 is supported by a coupling device 32, to which is attached a flexible drive 33 extending to a suitable position on the pulling vehicle, whereby the front wheels of the trailer may be raised and lowered while the vehicles are in motion.

Instead of the mechanism of Figure 19 having a rack arrangement for operating the guide members, a lever arrangement such as shown in Figures 24 and 35 may be used. In these figures, a lever 34 of the usual vehicle brake type operates a rod 35 which is attached to an arm 36 rotatable with a rod 37 carried by a body member, it being understood that the rod 37 extends all the way across the vehicle to operate a similar lever 36 on the other side. The lower end of the arm 36 is slotted at 38 to receive the front axle 7 which is fastened to the front end of a support plate member 39 which carries, at its rear end, the rear axle 8. Intermediate the shafts 7 and 8, is a rod or bar 47.

To the rod 47 is attached a member 40 comprising part of a shock absorber 41, the opposite end 42 of which is fastened to an arm 43 of a V-shaped member 44 which has a slot 45 therein through which the member 47 extends. The V-shaped member 44 has a stud 46 upon which the central part of the spring 13 is mounted, the ends of the spring being mounted on the frame in the manner heretofore described, or by an equivalent arrangement.

It will be seen, upon the operation of the lever 34, that the arm 36 is oscillated with the pivot rod 37, causing the forward end of the member 39 to move forwardly and upwardly as shown in Figure 35 since the rod 47 slides along in the slot 45 of the member 44. Thus the front wheels are lifted off the ground and the relative position between the center line of gravity of the body and the vertical center line of the rear wheels is shifted.

In Figures 36 and 37 is shown another modification in which a hydraulic cylinder 48 is used instead of the hand power lever 34, one operating end, 49, of which is connected at 50 to a lever 51 pivoted at 52 to a body member. The lower end of the lever 51 is slotted at 53 to receive a rod 54 which passes transversely across the trailer to cooperate with a lever 51 on the opposite side. The rod 54 is fastened to a plate 55 which has its opposite ends fastened to the wheel axles 7 and 8. The rod 54 passes through a slot 56 in a member 57 which is somewhat similar in shape to the member 44.

In Figures 38 to 41 inclusive, a hydraulic means 48 is connected to a lever 58 pivoted at 59 to a frame support member. The lever 58 has its lower end angularly bent and provided with a slot 60 through which the axle or stub shaft 7 passes. Fastened to the stub shaft 7 is a plate member 61, on the rear end of which is fastened the stub shaft 8 which supports the rear wheels. The plate 61 carries a rod 62 which passes transversely across the machine to engage a similar member on the other side. The rod 62 rides in a slot 63 in a member 64 that has its opposite ends fastened at 65 and 66 to the ends of an inverted spring 67. The center portion of the spring 67 rests on a stud 68 that is fastened by suitable fastening means to the frame support member, so that when the power means is applied to the hydraulic means 48, the lever 58 is operated to raise the front wheels from the ground, at the same time shifting the position of the rear wheels with respect to the body. Consequently, the general result is the same as in the construction shown in Figures 36 and 37.

It will be noted that in Figures 36 and 37 I have shown outriggers 69 at the front and rear of the trailer which may be moved downwardly into engagement with the surface on which the wheels are resting, for the purpose of supporting the trailer off the wheels.

It will be obvious that various changes may be made in the details entering into the various structures described, without departing from the spirit of my invention or the scope of the appended claims.

What I claim is:

1. In a vehicle having wheels and a spring-supported body, means for shifting the relative position of the body and wheels, said means including a support-and-guide member on each side of the vehicle, stub shafts comprising wheel axles fastened to and in spaced relation to said support-and-guide members, a brace member extending transversely of the vehicle and anchored to said guide members midway between the wheel axles, fittings slidably mounted on said guide members and carrying the springs that support the body, means carried by the guide members for releasably holding said fittings directly over said transversely positioned brace member during normal operation of the vehicle, especially under load.

2. A vehicle structure as set forth in claim 1, further defined in that means are provided for anchoring the front end of said guide members to the body after the fittings have been moved back of the rear wheel axles, whereby the shift of the center of gravity of the body and load causes the guide members to tilt so as to bring their front ends into engagement with said anchoring means and at the same time to raise the front wheels accordingly.

3. A vehicle structure as set forth in claim 1, further defined in that means are provided for anchoring the front end of said guide members to the body after the fittings have been moved back of the rear wheel axles, whereby the shift of the center of gravity of the body and load causes the guide members to tilt so as to bring their front ends into engagement with said anchoring means and at the same time to raise the front wheels accordingly, and stop means at the rear ends of said guide members to prevent said fittings from sliding off the guide members.

4. In a vehicle having forward and rear axles carrying wheels and a spring-supported body, means for shifting the relative position of the body and wheels, said means including T-shaped guide members disposed one on each side of the vehicle between the body and the wheels and fastened to the axles carrying the wheels, fittings slidably mounted on said guide members and carrying the springs that support the body, means for holding, under normal conditions, the fittings substantially midway between the forward and rear wheel-axles, said holding means being releasable to allow the fittings to slide on said guide members when occasion requires for the purpose described.

5. A vehicle structure as set forth in claim 4, further defined in that said guide members are cross-connected by a brace member positioned midway between the front and rear wheel axles.

6. A vehicle structure as set forth in claim 4, further defined in that means are provided for anchoring the front ends of said guide members to the body after the fittings have been moved back of the rear wheel axles, whereby the shift of the center of gravity of the body and load causes the guide members to tilt so as to bring their front ends into engagement with said anchoring means and at the same time to raise the front wheels accordingly.

7. A vehicle structure as set forth in claim 4, further defined in that said guide members are cross-connected by a brace member positioned midway between the front and rear wheel axles, and stop means at the rear ends of said guide members to prevent said fittings from sliding off the guide members.

8. In a vehicle having a body structure and a wheel structure, means for longitudinally shifting the relative position of the two structures until the center of gravity of the body structure and load is to the rear of the rear wheel axles, whereby the front wheels will be raised, and means for fastening the wheel structure in this tilted position.

9. In a vehicle having body and wheel structures, the wheel structure having a plurality of wheels arranged in longitudinally spaced relation on each side of the structure and means for longitudinally shifting either of said entire structures with respect to the other to force tilting of the wheel structure.

10. In a vehicle having body and wheel structures, the wheel structure having front and rear sets of wheels, means for raising and lowering the front set of wheels by longitudinally shifting either entire structure with respect to the other as and for the purposes described.

11. In a vehicle having body and wheel structures, the wheel structure having front and rear sets of wheels, means for raising and lowering the front set of wheels while the vehicle is in motion by longitudinally shifting the relative position of the two structures.

12. In a vehicle having body and wheel structures, the wheel structure including a pair of members, one on each side of the body structure, stub shafts fastened to said members at opposite ends thereof, wheels carried on said stub shafts means for supporting the body structure on said members, and means acting on said members to cause them to tilt so as to lift the front wheels off the traveled surface.

13. In a vehicle having body and wheel structures, the wheel structure including a pair of guide members, one on each side of the body structure, stub shafts fastened to said members at front and rear ends thereof, wheels carried on said stub shafts means for supporting the body structure on said members, and a mechanism, to which force may be applied at will, connected to said members to cause the front ends thereof to move upwardly and thereby raise the front wheels off the terrain.

14. In a vehicle having a body structure and a wheel structure, the latter including a pair of guide members, one on each side of the body structure, stub shafts fastened to said members at front and rear ends thereof, wheels carried on said stub shafts means for slidably supporting the body structure on said members, a gear rack carried by said members, gears in mesh with said rack, and means for operating said gears to cause the body structure to move along the rack and said members carrying the rack so as to cause the front ends of said members to move upwardly and thereby raise the front wheels off the terrain.

15. A trailer adapted to be drawn by a power-operated vehicle, the trailer having a wheel structure including front and rear sets of wheels and a body structure carried by the wheel structure and shiftable with respect thereto by reverse movement of the power-operated vehicle when said wheel structure is held stationary for the purpose described.

16. A trailer adapted to be drawn by a power-operated vehicle, the trailer having a wheel structure including front and rear sets of wheels and a body structure carried by the wheel structure, the two structures being horizontally shiftable, one with respect to the other, whereby under one condition of operation the front set of wheels will be automatically raised and then lowered under another condition of operation.

17. A trailer adapted to be drawn by a power-operated vehicle, the trailer having a wheel structure including front and rear sets of wheels and a body structure carried by the wheel structure, means for locking said structures together so the center of gravity of the body structure is substantially midway between the front and rear wheel axles, said structures being slidable with respect to each other when unlocked and force is applied thereto, whereby the center of gravity of the body structure moves back of the rear wheel supports and allows the wheel structure to tilt so as to raise the front wheels as and for the purposes described.

18. In a vehicle having a unitary body structure and a unitary wheel structure composed of at least two pairs of wheels set in substantially fixed longitudinal position on the wheel structure, power-operative means for longitudinally shifting the relative position of the two entire structures, the body being mounted on the wheel structure so that relative shifting of the two structures will cause the entire wheel structure to tilt.

KIBBEY W. COUSE.